United States Patent [19]

Nonaka

[11] Patent Number: 4,893,596
[45] Date of Patent: Jan. 16, 1990

[54] COMBUSTION CHAMBER FOR SPARK IGNITED ENGINE

[75] Inventor: Kimihiro Nonaka, Hamamatsu, Japan

[73] Assignee: Sanshin Kogyo Kabushiki Kaisha, Shizuoka, Japan

[21] Appl. No.: 936,337

[22] Filed: Dec. 1, 1986

[30] Foreign Application Priority Data

Nov. 29, 1985 [JP]   Japan .................................. 60-267418

[51] Int. Cl.$^4$ ............................................. F02B 23/00
[52] U.S. Cl. .................................. 123/193 P; 123/661
[58] Field of Search .................... 123/193 P, 257, 269, 123/279, 73 F, 307, 661

[56] References Cited

U.S. PATENT DOCUMENTS

| | | | |
|---|---|---|---|
| 3,175,543 | 3/1965 | Drebes ................................. | 123/269 |
| 3,965,872 | 6/1976 | Taira et al. .......................... | 123/269 |
| 4,367,707 | 1/1983 | Suzuki ................................. | 123/661 |

Primary Examiner—Henry A. Bennet

[57] ABSTRACT

A number of embodiments of combustion chamber configurations that provide a very shallow height squish area but the head of the piston does not, at its periphery, extend above the cylinder block and into the area where the cylinder head gasket lies.

10 Claims, 3 Drawing Sheets

COMBUSTION CHAMBER FOR SPARK IGNITED ENGINE

BACKGROUND OF THE INVENTION

This invention relates to a combustion chamber for a spark ignited engine and more particularly to a combustion chamber that promotes rapid flame travel through the use of a squish area and which nevertheless offers economy of construction.

It is well known that one way of avoiding the phenomenon known as "knocking" in an internal combustion engine is to cause the flame propagation in the combustion chamber to occur more rapidly. One of the main causes of knocking is slow flame travel which results in auto ignition in the remote areas of the combustion chamber. Flame propagation may be accelerated through the use of various turbulence inducing devices in the combustion chamber. One of the most widely utilized turbulence inducing arrangements utilizes a squish area. The squish area is a restricted area between the head of the piston and the adjacent surface of the cylinder head. As the piston approaches its top dead center position, the fuel/air mixture in the squish area is squeezed from this area and injected at a high velocity into the larger volume of the combustion chamber. As should be readily apparent, the more restricted the height of the squish area, the greater its effect.

There are, however, certain practical limits to the amount of reduction possible in the squish area height. For example, the squish height may be reduced through a thinning of the cylinder head gasket. However, thin cylinder head gaskets can cause problems in failing to provide effective sealing. In addition, the thin gaskets are prone to failure.

Another way that the squish height may be reduced is by forming a raised area on the head of the piston that extends above the cylinder bore. When this is done, however, the piston will extend into the area where the cylinder head gasket lies. As a result, it is necessary to accurately locate the bore diameters of the cylinder head gasket and to insure an accurate location of the cylinder head gasket upon assembly so as to avoid interference with the piston head. The use of such high tolerances and careful assembly techniques can add significantly to the cost of the engine, however.

It is, therefore, a principal object of this invention to provide an improved combustion chamber configuration for an internal combustion engine.

It is a further object of this invention to provide a combustion chamber configuration that affords a high squish action but which avoids the disadvantages aforenoted.

It is a further object of this invention to provide a combustion chamber configuration for an internal combustion engine that has a high squish area and which is able to achieve this without the use of thin cylinder head gaskets or high tolerances and complicated manufacturing techniques.

SUMMARY OF THE INVENTION

This invention is adapted to be embodied in an internal combustion engine having a cylinder a cylinder bore and a piston reciprocating in the cylinder bore. A cylinder head is affixed to the cylinder and closes the cylinder bore. A clearance volume is defined by the cylinder head and the piston when the piston is in its top dead center position. This clearance volume includes a squish area that is adjacent at least a portion of the cylinder bore and which squish area has a height in the direction of the axis of the cylinder bore less adjacent the cylinder bore than at a space inwardly toward the cylinder bore axis.

DETAILED DESCRIPTION OF THE PREFERRED EMBODIMENTS

Figure 1:
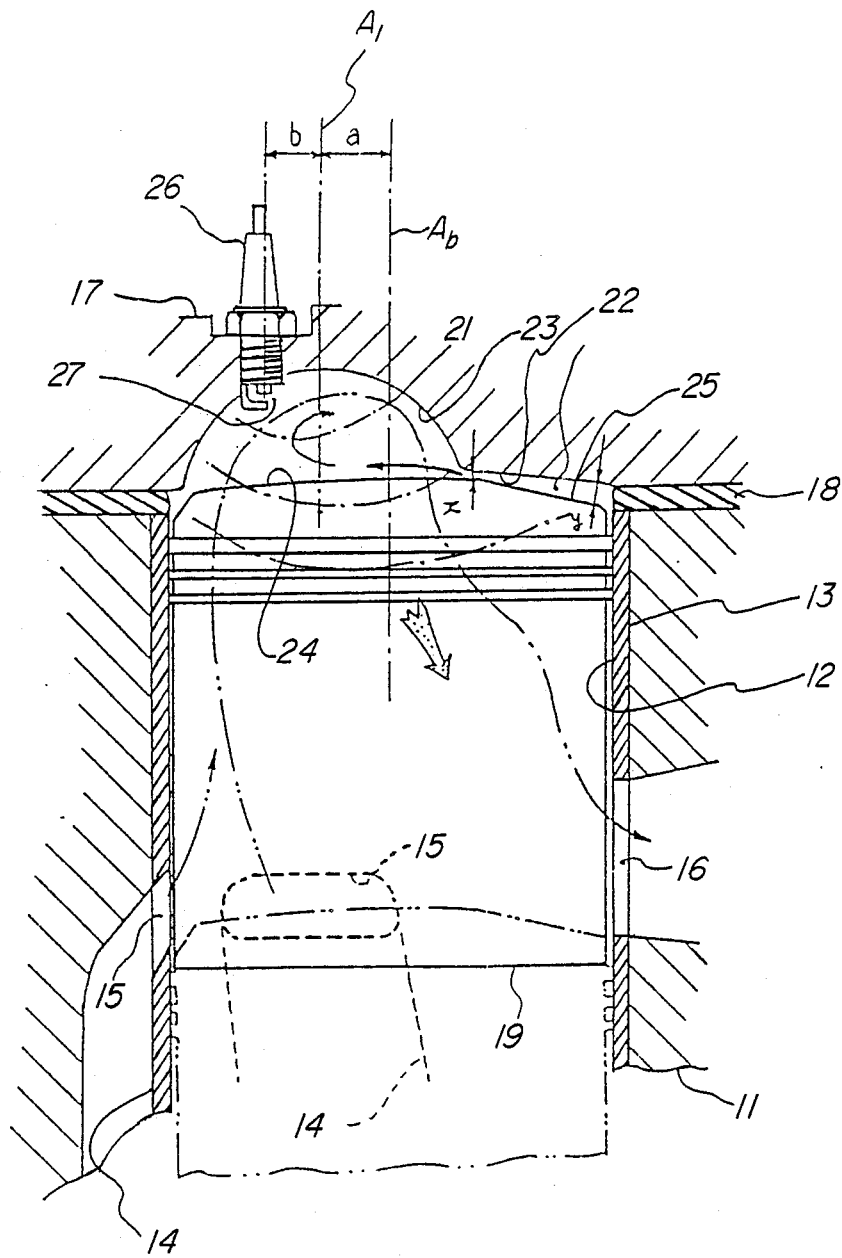
FIG. 1 is a cross-sectional view taken through the cylinder of an engine constructed in accordance with a first embodiment of the invention.

Each embodiment of the invention shows a single cylinder in cross-section along a plane taken perpendicular to the axis of the cylinder bore. The cylinder block construction in each embodiment is the same and includes a cylinder block 11 having a cylinder bore 12 defined by an inserted cylinder liner 13. In each of the illustrated embodiments, the engine is of the two-cycle, crankcase compression type and embodies a loop scavenging system. To this end, there are provided a plurality of transfer or scavenge passages 14 that discharge into the cylinder bore 13 through intake ports 15 that are disposed so as to cause the compressed fuel/air charge to be transferred from the crankcase into the combustion chamber in a generally upward direction and along one side of the cylinder bore 12. On the opposite side, the cylinder block is provided with an exhaust port 16 through which the exhaust gases are discharged to the atmosphere through a suitable exhaust manifold (not shown). Although the invention and the illustrated embodiments all show such loop scavenged crankcase compression, two-cycle engines, it is to be understood that the invention may be employed with engines of other types.

In each embodiment, a cylinder head, indicated generally by the reference numeral 17, is affixed to the cylinder block 11 is a known manner and a cylinder head gasket 18 is interposed between the cylinder head 17 and the cylinder block 11. Also, in each embodiment, a piston 19 is supported for reciprocation within the cylinder bore 12 and is coupled by means of a connecting rod (not shown) to a crankshaft for driving it in a known manner.

The individual embodiments of the invention differ each from the others in the shape of the combustion chambers. The combustion chamber configuration is determined by the configuration of the undersurface of the cylinder head 17 and the head of the piston 19 and the configuration for each of the embodiments will now be described by reference to the particular figures.

Referring first to the embodiment of FIG. 1, the combustion chamber is formed by a hemispherical recess 21 that is formed in the cylinder head lower surface and which is disposed or generated about an axis that lies on a line $A_1$ which is offset from the central axis of the cylinder bore 12 ($A_b$) by a distance a. It will be noted that the peripheral edge of the main combustion chamber recess 21 is displaced to the side of the cylinder bore 12 adjacent the scavenge or intake ports 15 and particularly the port 15 that is disposed opposite to the exhaust port 16. Surrounding the recess 21 is a squish area, indicated by the reference numeral 22. The squish area 22 is defined by a generally planar lower surface 23 of the cylinder head 17 surrounding the recess 21.

The piston 19 has a first generally flat head portion 24 that opposes the recess 21 of the cylinder head 17 and which is closely adjacent to it when the piston 19 is in the top dead center position as shown in FIG. 1. The head portion 24 extends over and overlaps a portion of the cylinder head surface 23 and defines a relatively narrow gap x therebetween. However, from the flattened area 24 and toward the remainder of the cylinder bore 12, the head of the piston 19 is formed with a generally tapered part 25 that is inclined downwardly so that at the periphery of the cylinder bore 12, the head of the piston area 25 lies below of at the top of the cylinder block 10 and below the gasket 18. In this area, the squish area has a height y, which height is greater than the height x. As a result, there will be a relatively shallow squish height, however, the head of the piston will be below the adjacent cylinder head gasket 18 and there need not be any close tolerances for the opening in the cylinder head gasket for the cylinder bore 12 or in the fitting of the gasket to the head 17 and block 11.

As has been previously noted, the engines embodies a loop scavenging system and in order to assure good flame propagation and the appropriate turbulence, a spark plug 26 is mounted in the cylinder head cavity 21 at a distance b from its axis $A_1$ toward the scavenge port 15 that opposes the exhaust port 16. In this way, its gap 27 will be disposed so as to intercept the flow of the fuel/air mixture at top dead center position to insure good flow across the spark plug so that the flame will propagate rapidly. Also, the squish area 22 causes a turbulent flow to enter into the larger combustion chamber portion 21 from the remote areas and will further increase the turbulence and flame propagation.

Figure 2:
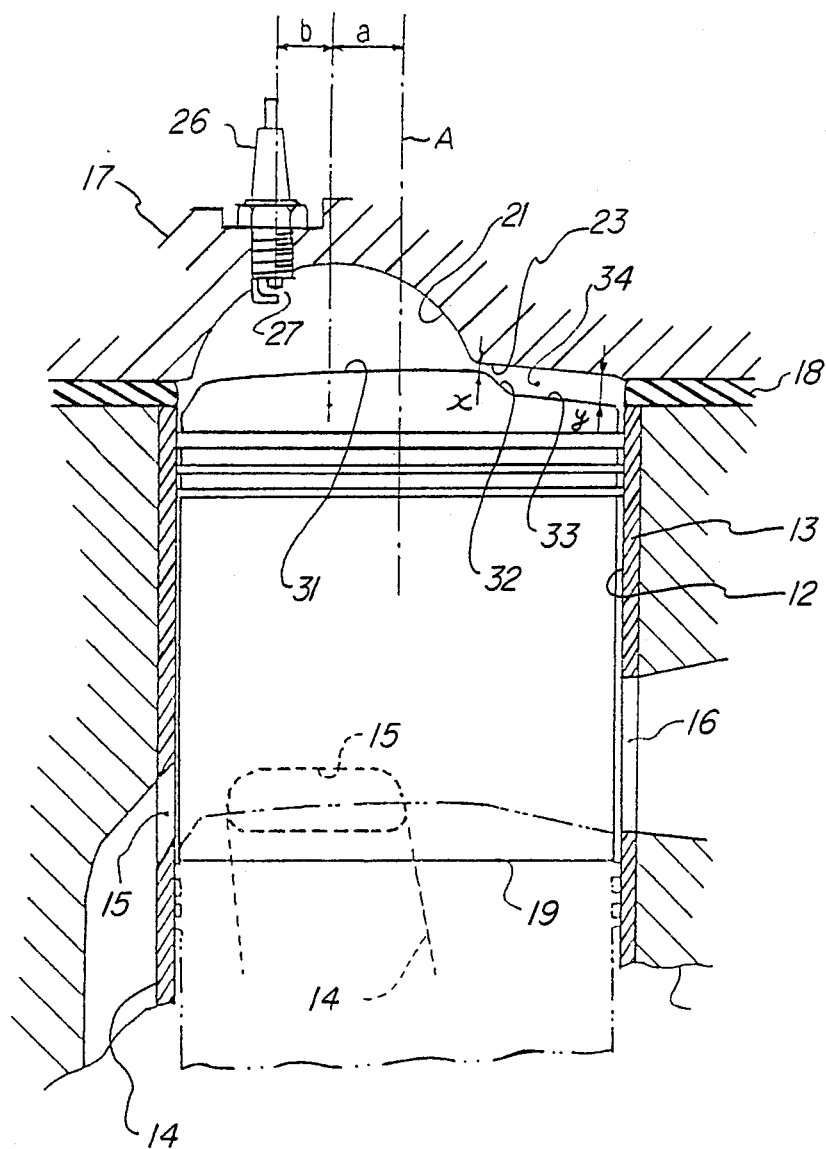
FIG. 2 is a cross-sectional view, in part similar to FIG. 1, showing another embodiment of the invention.

FIG. 2 shows another embodiment of the invention wherein the configuration of the cylinder head is the same as that of the embodiment of FIG. 1. For that reason, the cylinder head surfaces aforedescribed have been identified in this figure by the same reference numerals as has the spark plug and spark plug gap, the location of which also are the same as in the embodiment of FIG. 1. This embodiment differs from the previously embodiment only in the shape of the head of the piston 19 and that shape will now be described by reference to this figure.

The piston 19 in this embodiment also has a generally flat area 31 which opposes the underside of the cylinder head recess 21. At the side adjacent the exhaust port 19, the flat portion 31 overlies the cylinder head squish surface 23 and then has a downwardly inclined part 32 that terminates in a generally downwardly and outwardly tapered portion 33. Thus, as in the embodiment of FIG. 1, there is a squish area 34 that has a relatively shallow height but the piston head 33 lies below the cylinder head gasket 18 to achieve the aforedescribed result. Again, the flow patterns at top dead center will be the same or similar to that of FIG. 1 and it is believed unnecessary to described them again.

Figure 3:
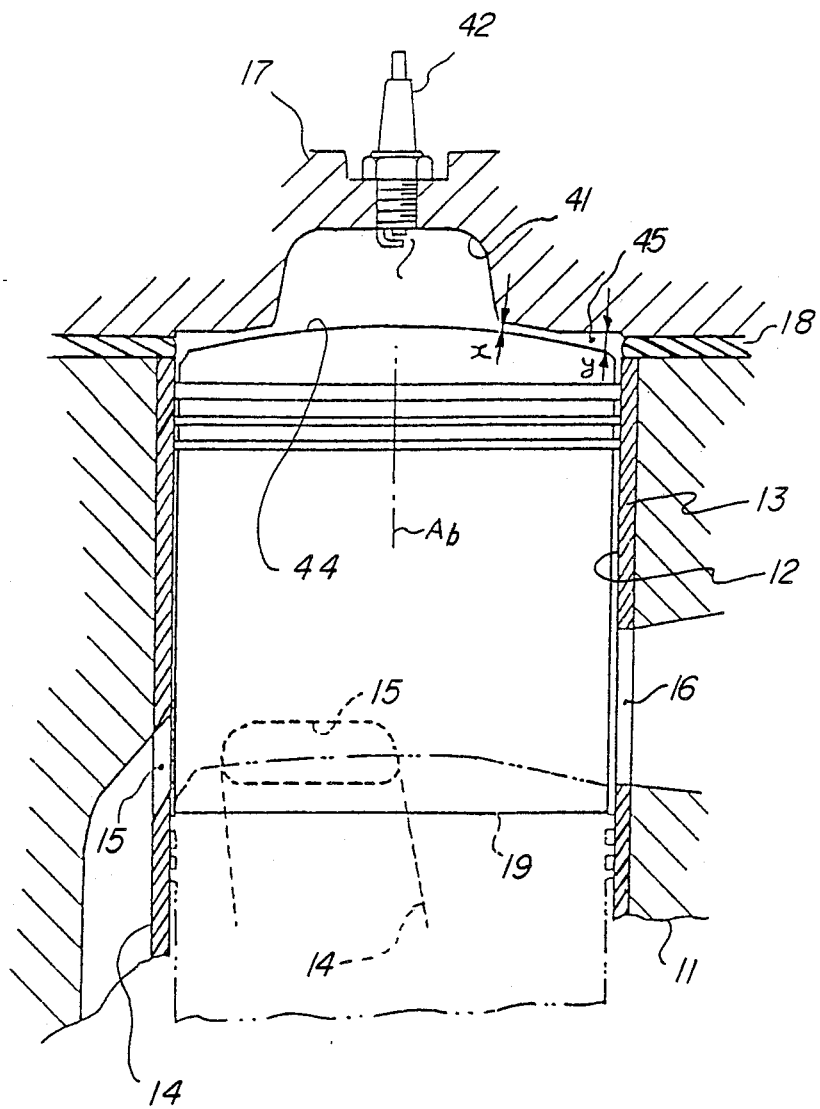
FIG. 3 is a cross-sectional view, in part similar to FIGS. 1 and 2, showing yet another embodiment of the invention.

A still further embodiment of the invention is illustrated in FIG. 3. In this embodiment, the cylinder head 17 is formed with a centrally positioned recess 41 that is defined by a surface of revolution that lies on the cylinder bore axis $A_b$. The shape of the recess is generally a conical segment. A spark plug 42 is supported within the cylinder head 17 with its gap 43 disposed at the center of the recess 41.

The piston 19 is formed with a generally domed head 44 that is disposed in a symmetric fashion about the axis $A_b$ and which defines a squish area 45 surrounding the recess 43 when the piston 19 is in its top dead center position as shown in this figure. When the piston 19 is at top dead center, the squish area 45 communicates with the larger combustion chamber area 41 through a relatively narrow gap indicated by the dimension x. However, at the periphery of the combustion chamber and specifically adjacent the cylinder bore 12, there is a substantially greater distance indicated by the dimension y. As in the previously described embodiments, the piston head 44 at this point lies at or below the upper surface of the cylinder head 11 and below the cylinder head gasket 18 so as to achieve the results as aforedescribed with the other two embodiments.

It should be readily apparent, therefore, that each of the illustrated embodiments achieves a high turbulence in the combustion chamber through a very restricted squish area without the necessity of having the peripheral edge of the piston extend above the cylinder block and into the area of the cylinder head gasket 18. Although three embodiments of the invention have been illustrated and described, it is to be understood that various changes and modifications may be made without departing from the spirit and scope of the invention, as defined by the appended claims.

I claim:

1. In a two cycle crankcase compression type internal combustion engine having a cylinder defining a cylinder bore, a piston reciprocating in said cylinder bore, a cylinder head affixed to said cylinder and closing said cylinder bore, a cylinder head gasket between said cylinder head and said cylinder and surrounding said cylinder bore, a clearance volume defined between said cylinder head and said piston when said piston is in the top dead center position, the peripheral edge of said piston being below said cylinder when said piston is in top dead center position, said clearance volume including a combustion recess formed in said cylinder head surrounded at least in part by a squish area adjacent at least a portion of said cylinder bore, said squish area having a height in the direction of the axis of said cylinder bore greater adjacent said cylinder bore than at a point spaced inwardly toward said cylinder bore axis for providing clearance between said piston and said cylinder head and said cylinder head gasket, a spark plug in said cylinder head with the gap in said combustion recess, and intake ports and exhaust ports in said cylinder configured to achieve loop scavenging, said combustion recess being disposed on the side of said cylinder bore opposite to said exhaust port.

2. In an internal combustion engine as set forth in claim 1 wherein the cylinder head recess is a volume of revolution about an axis that extends parallel to the cylinder bore axis.

3. In an internal combustion engine as set forth in claim 7 wherein the recess is a hemisphere.

4. In an internal combustion engine as set forth in claim 3 wherein the combustion recess is offset from the cylinder bore axis on the side opposite to the exhaust port.

5. In an internal combustion engine as set forth in claim 4 wherein the spark plug is offset from the axis of the combustion recess on the side away fromo the exhaust port.

6. In a two cycle crankcase compression internal combustion engine having a cylinder defining a cylinder bore, a piston reciprocating in said cylinder bore, a cylinder head affixed to said cylinder and closing said cylinder bore, a clearance volume defined between said cylinder and said piston when said piston is in top dead center position, the peripheral edge of said piston lying below said cylinder when said piston is in top dead center position, said clearance volume comprising a combustion recess found in each cylinder head at one side of said cylinder bore and surrounded at least in part by a squish area adjacent at least a portion of said cylinder bore, said squish area having a height in the direction of the axis of said cylinder bore greater adjacent said cylinder bore than at a point spaced inwardly toward said cylinder bore axis and a combustion recess formed in said cylinder head and a spark plug having its gap in said combustion recess, said combustion recess being disposed opposite to said exhaust port.

7. In an internal combustion engine as set forth in claim 6 wherein the cylinder head recess is a volume of revolution about an axis that extends parallel to the cylinder bore axis.

8. In an internal combustion engine as set forth in claim 6 wherein the spark plug is offset from the axis of the combustion recess on the side away from the exhaust port.

9. In a two cycle crankcase compression internal combustion engine as set forth in claim 6 wherein the offset of the combustion chamber recess induces a swirl in the combustion recess from the squish area that flows in the same direction as the direction of loop scavenging.

10. In a two cycle crankcase compression internal combustion engine as set forth in claim 8 wherein the offset of the combustion chamber recess induces a swirl in the combustion recess from the squish area that flows in the same direction as the direction of loop scavenging.

* * * * *

UNITED STATES PATENT AND TRADEMARK OFFICE
CERTIFICATE OF CORRECTION

PATENT NO. : 4,893,596

DATED : January 16, 1990

INVENTOR(S) : Kimihiro Nonaka

It is certified that error appears in the above-identified patent and that said Letters Patent is hereby corrected as shown below:

Column 4, line 60, Claim 3, "7" should be --2--.

Column 4, line 67, Claim 5, "fromo" should be --from--.

Signed and Sealed this

Eighth Day of September, 1992

*Attest:*

DOUGLAS B. COMER

*Attesting Officer*   Acting Commissioner of Patents and Trademarks